(12) United States Patent
Mori et al.

(10) Patent No.: US 8,329,340 B2
(45) Date of Patent: Dec. 11, 2012

(54) NEGATIVE ELECTRODE, AND NON-AQUEOUS ELECTROLYTE SECONDARY BATTERY USING THE SAME

(75) Inventors: Tamami Mori, Fukushima (JP); Mahio Shibuya, Fukushima (JP)

(73) Assignee: Sony Corporation, Tokyo (JP)

( * ) Notice: Subject to any disclaimer, the term of this patent is extended or adjusted under 35 U.S.C. 154(b) by 473 days.

(21) Appl. No.: 11/844,634

(22) Filed: Aug. 24, 2007

(65) Prior Publication Data

US 2008/0057401 A1    Mar. 6, 2008

(30) Foreign Application Priority Data

Sep. 1, 2006    (JP) ................................ P2006-238074

(51) Int. Cl.
*H01M 4/13* (2010.01)
(52) U.S. Cl. ................. 429/231.4; 429/231.7; 429/231.8
(58) Field of Classification Search .......................... None
See application file for complete search history.

(56) References Cited

U.S. PATENT DOCUMENTS

| | | | | |
|---|---|---|---|---|
| 5,908,715 A | * | 6/1999 | Liu et al. ........................ | 429/217 |
| 6,335,122 B1 | * | 1/2002 | Yamada et al. ............. | 429/231.4 |
| 2004/0124402 A1 | * | 7/2004 | Nanba et al. ................... | 252/500 |
| 2004/0137333 A1 | * | 7/2004 | Nishiyama et al. ............ | 429/330 |
| 2006/0172201 A1 | * | 8/2006 | Yasukawa et al. ............ | 429/329 |
| 2006/0281012 A1 | * | 12/2006 | Ugawa et al. .................. | 429/330 |
| 2007/0190416 A1 | * | 8/2007 | Yamada et al. ............ | 429/218.1 |

FOREIGN PATENT DOCUMENTS

| | | |
|---|---|---|
| JP | 03-252053 | 11/1991 |
| JP | 04-368778 | 12/1992 |
| JP | 08-138671 | 5/1996 |
| JP | 08-153514 | 6/1996 |
| JP | 08153514 | * 6/1996 |
| JP | 09147858 | * 6/1997 |
| JP | 10-079252 | 3/1998 |
| JP | 11-111265 | 4/1999 |
| JP | 2000-123873 | 4/2000 |
| JP | 2000-340231 | 12/2000 |
| JP | 2003-031219 | 1/2003 |
| JP | 2003-092150 | 3/2003 |
| JP | 2003-132943 | 5/2003 |
| JP | 2004-047131 | 2/2004 |

OTHER PUBLICATIONS

Japanese Office Action issued on Mar. 2, 2010 for corresponding JP2006-238074.

* cited by examiner

*Primary Examiner* — Melvin C Mayes
*Assistant Examiner* — Sheng H Davis
(74) *Attorney, Agent, or Firm* — K&L Gates LLP (57) ABSTRACT

A negative electrode for a non-aqueous electrolyte secondary battery is provided. The negative electrode includes: an electro-conductive base; a first layer provided on the electro-conductive base; and a second layer provided on the first layer. The first layer includes at least a graphitic material as a negative active material. The second layer includes at least a non-graphitizable carbonaceous material as a negative active material.

10 Claims, 2 Drawing Sheets

NEGATIVE ELECTRODE, AND NON-AQUEOUS ELECTROLYTE SECONDARY BATTERY USING THE SAME

CROSS REFERENCES TO RELATED APPLICATIONS

The present application claims priority to Japanese Patent Application JP 2006-238074 filed in the Japanese Patent Office on Sep. 1, 2006, the entire contents of which being incorporated herein by reference.

BACKGROUND

The present disclosure relates to a non-aqueous electrolyte secondary battery, and in detail, to a non-aqueous electrolyte secondary battery containing a carbonaceous material as a negative active material capable of occluding and releasing an electrode reaction substance.

According to recent trends in cordless and portable features of electronic instruments such as VTR (video tape recorder) with integrated camera, mobile phone, notebook-type personal computer and so forth, there have been active efforts of developing thin, small and lightweight portable electronic instruments one after another. Also with advancement in wider functionality and higher performance of the instruments, power consumption of the portable electronic instruments has been increasing, so that there are growing needs for larger capacity and reduction in weight of batteries as an energy source of these electronic instruments. In particular, secondary battery is understood as a key device for these electronic instruments, and is now a target of active research and development aimed at improving the energy density, and consequently non-aqueous electrolyte secondary battery using a non-aqueous electrolyte as the electrolyte has already been launched. Among others, lithium ion secondary battery, making use of doping/undoping, or inserting/extracting, of lithium ion, has widely been used by virtue of its high energy density as compared with conventional aqueous solution-base batteries such as lead battery, nickel-cadmium battery and so forth.

Conventional lithium ion secondary battery makes use of lithium cobalt oxide for the positive electrode, and a carbonaceous material for the negative electrode, wherein charging in a non-aqueous electrolyte results in electrochemical doping of lithium in the positive electrode into interlayer of carbon composing the negative electrode. Carbon thus doped or having inserted with lithium can act as a lithium electrode, while allowing lithium to be undoped or extracted from the carbon interlayer with progress of discharging, and to go back into the positive electrode. With regard to such lithium ion secondary battery, Japanese Patent Application Publication (KOKAI) No. H03-252053 proposed a method of improving the cycle performance, by using a non-graphitizable carbonaceous material, having an interplanar spacing of the (002) surfaces of 3.70 Å or larger, and a true density of smaller than 1.70 g/cm$^3$ as the negative electrode, so as to improve acceptability of lithium ion into the carbon interlayer of the negative electrode.

In these days, graphites which are high-crystallinity carbonaceous materials having well-developed crystal structures have been used more widely as a negative electrode material. The graphites have true density larger than that of non-graphitizable carbonaceous materials having only low crystallinity, and can therefore raise the electrode packing performance when they are used as materials for the negative electrode.

As a countermeasure for liquid leakage which may otherwise be bothersome when a liquid-base electrolyte was used, lithium ion polymer secondary batteries, for example, using a gel-form polymer film impregnated with a non-aqueous electrolyte solution, or a solid-state electrolyte as the electrolyte, have been put into practical use. This sort of lithium ion polymer secondary batteries are characterized by having a self-supporting property of the battery element per se, because the electrolyte per se is immobilized, and further because the interface between the electrode and the electrolyte is immobilized.

Since these lithium ion polymer secondary batteries can use a laminated film for packaging, they can be thinned by deep drawing. They can also be reduced in weight as compared with those packaged by metal. They are appropriately adoptable to power sources for compact mobile instruments, because they are composed of a smaller number of components as compared with conventional batteries using battery can, and can therefore be manufactured at low costs.

This sort of non-aqueous electrolyte secondary batteries require shortening of charge time for improved convenience. Related art non-aqueous electrolyte secondary batteries, however, suffer from a problem in that lithium deposits onto the surface of the negative electrode with progress of the charge-discharge cycles, when they undergo repetitive charging under a high load rate (high-load charging) aimed at shortening the charge time. Deposition of lithium may decrease the amount of lithium ion insertable into the negative electrode, and may gradually decrease the capacity with progress of the charge-discharge cycles. Moreover, thus-deposited dendritic lithium may injure the separator, which is causative of micro-shortcircuiting, and may degrade the cycle performance. The dendritic lithium may even grow to penetrate the separator, and may cause internal shortcircuiting. It is therefore necessary to suppress the lithium deposition under high-load charging, and to improve the cycle performance.

SUMMARY

In an embodiment, a negative electrode is provided that does not cause lithium deposition even under repetitive high-load charging, and a non-aqueous electrolyte secondary battery is provided for realizing excellent charge-discharge cycle performance by adopting such negative electrode.

According to a first embodiment, there is provided a negative electrode for a non-aqueous electrolyte secondary battery, which includes an electro-conductive base; a first layer provided on the electro-conductive base; and a second layer provided on the first layer. In the negative electrode, the first layer contains at least a graphitic material as a negative active material; and the second layer contains at least a non-graphitizable carbonaceous material as a negative active material.

The graphitic material may preferably have an interplanar spacing of the (002) surfaces of 3.37 Å or smaller, and an Lc value of 150 Å or larger.

The graphitic material may preferably be an artificial graphite.

The non-graphitizable carbonaceous material may preferably have an interplanar spacing of the (002) surfaces of 3.44 Å or larger, and an Lc value of 80 Å or smaller.

According to a second embodiment, there is provided a non-aqueous electrolyte secondary battery including a positive electrode, a negative electrode, a separator and an electrolyte. In the non-aqueous electrolyte secondary battery, the negative electrode further includes an electro-conductive base having a pair of opposed surfaces, a first layer provided on the electro-conductive base, and a second layer provided on the first layer. The first layer contains at least a graphitic material as a negative active material, and the second layer contains at least a non-graphitizable carbonaceous material as a negative active material.

The electrolyte may preferably contain at least ethylene carbonate.

It is preferable that the electrolyte further contains at least any one species selected from the group consisting of propylene carbonate, dimethyl carbonate, ethyl methyl carbonate, and diethyl carbonate.

In the second aspect, the electrolyte may preferably contain at least any one species selected from the group consisting of polyvinylidene fluoride, copolymer of polyvinylidene fluoride and hexafluoropropylene, copolymer of polyvinylidene fluoride and hexafluoropropylene and monochlorotrifluoroethylene, and copolymer of polyvinylidene fluoride and hexafluoropropylene and monomethyl maleate.

In an embodiment, the negative electrode is configured to have a double-layered structure having the first layer provided on the electro-conductive base, and the second layer provided on the first layer, and to use the graphitic material as the negative active material. This configuration enables obtaining high energy density by raising the packing density of the negative electrode. In addition, the present embodiments improve the acceptability and dispersibility of lithium ion on the surface of the negative electrode, by using a non-graphitizable carbonaceous material as the negative active material contained in the second layer on the surface side of the negative electrode.

According to an embodiment, a negative electrode well suppressed in the lithium deposition even under high-load charging can be obtained, and the non-aqueous electrolyte secondary battery using the negative electrode can suppress lowering in the capacity retention ratio with progress of charge-discharge cycles under high-load charging, and can thereby realize excellent charge-discharge cycle performance.

Additional features and advantages are described herein, and will be apparent from, the following Detailed Description and the figures.

Figure 1:
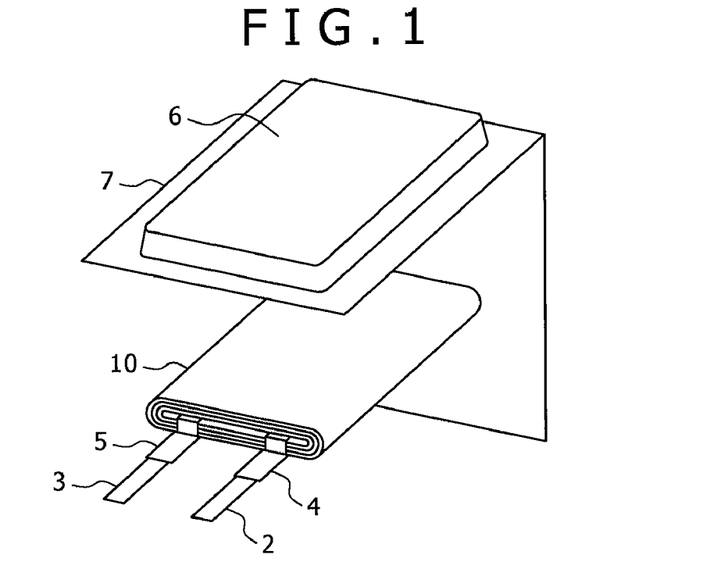
FIG. 1 is a schematic drawing showing a structure of a non-aqueous electrolyte secondary battery according to a first embodiment.

DETAILED DESCRIPTION (1) First Embodiment
(1-1) Configuration of Non-Aqueous Electrolyte Secondary Battery FIG. 1 shows an exemplary configuration of a non-aqueous electrolyte secondary battery according to a first embodiment.

The non-aqueous electrolyte secondary battery has a battery element 10 housed in a casing 7 made of a moisture-proof laminate film, in which the battery element 10 is welded around the circumference thereof. The battery element 10 has a positive electrode lead 2 and a negative electrode lead 3 which are drawn out to the external while being bitten with the casing 7. The positive electrode lead 2 and the negative electrode lead 3 have, on both surfaces thereof, resin strips 4 and resin strips 5, respectively, aiming at improving adhesiveness with the casing 7.

[Casing]

A laminate film having a stacked structure having a fused layer, a metal layer, and a surface protective layer stacked in this order is adoptable as the casing 7. The fused layer is composed of a polymer film, wherein a material composing the polymer film can be exemplified by, for example, polypropylene (PP) and polyethylene (PE). The metal layer is composed of a metal foil, wherein a material composing the metal foil can be exemplified by aluminum (Al). Alternatively, also metals other than aluminum (Al), and stainless steel (SUS) may be used as the material composing the metal foil. A material composing the surface protective layer can be exemplified by, for example, nylon (Ny) and polyethylene terephthalate (PET). It is to be noted that surface thereof on the fused layer side will be a housing surface on the side the battery element 10 is housed. A battery element housing portion 6 is provided typically by deep drawing effected from the fused layer side.

[Battery Element]

Figure 2:
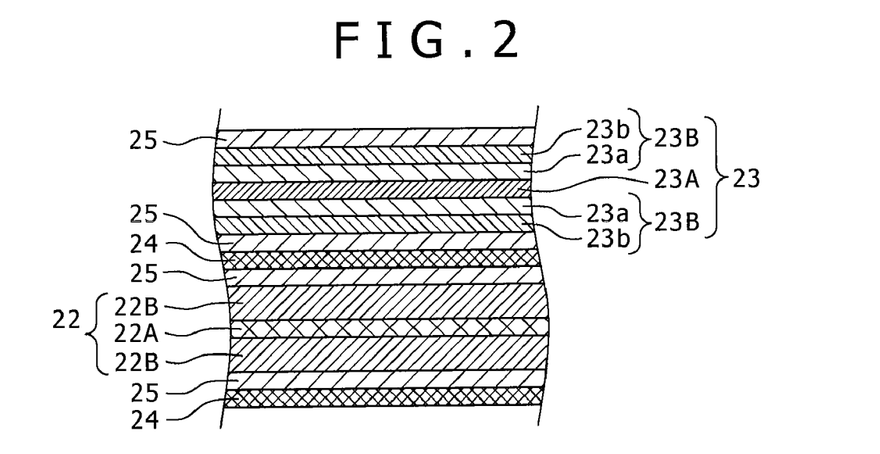
FIG. 2 is an enlarged sectional view showing a part of the battery element shown in FIG. 1.

The battery element 10 is of rolled-up type typically shown in FIG. 2, configured by stacking a band-form negative electrode 23 having gel electrolyte layers 25 provided on both surfaces thereof, a separator 24, a band-form positive electrode 22 having gel electrolyte layers 25 provided on both surfaces thereof, and a separator 24, and by rolling the stack in the longitudinal direction.

[Positive Electrode]

The positive electrode 22 is composed of a band-form positive electrode current collector 22A as an electro-conductive base, and positive electrode active material layers 22B formed on both surfaces of the positive electrode current collector 22A. Alternatively, the positive electrode 22 may be configured as having a region, where the positive electrode active material layer 22B is provided, only on one surface of the positive electrode current collector 22A.

The positive electrode 22 has the positive electrode lead 2 provided to one end thereof in the longitudinal direction. Aluminum (Al), for example, may be used as a material composing the positive electrode lead 2.

The positive electrode current collector 22A is a metal foil composed of aluminum (Al), for example. The positive electrode active material layer 22B typically contains a positive electrode active material, and may optionally contain an electro-conductive material such as carbon black and graphite, and a binder such as polyvinylidene fluoride and polytetrafluoroethylene.

Examples of the positive electrode active material include lithium-containing transition metal compound such as lithium oxide, lithium phosphorus oxide and lithium sulfide. Lithium-containing transition metal oxide containing lithium and a transition metal element and oxygen (O) is preferable, in view of raising the energy density, and among them, those containing at least one transition metal element selected from cobalt (Co), nickel (Ni), manganese (Mn) and iron (Fe) are more preferable. This sort of lithium-containing transition metal compound may be exemplified by a lithium-containing transition metal compound expressed by the chemical formula 1 below, or a lithium-based phosphate expressed by the chemical formula 2 below, specifically including $LiNi_{0.50}CoMn_{0.30}O_2$, $LiCoO_2$, $LiNiO_2$, $LiNi_cCo_{1-c}O_2$ (0<c<1), $LiMn_2O_4$ and $LiFePO_4$.

$$Li_pNi_{(1-q-r)}Mn_qM1_rO_{(2-y)}X_z \quad \text{(Chemical Formula 1)}$$

(M1 represents at least one element selected from the group II to group XV, but excluding nickel (Ni) and manganese (Mn). X represents at least one element selected from the group XVI and group XVII, but excluding oxygen (O). In the formula, p, q, r, y and z represent values fall in ranges of $0 \leq p \leq 1.5$, $0 \leq q \leq 1.0$, $0 \leq r \leq 1.0$, $-0.10 \leq y \leq 0.20$, and $0 \leq z \leq 0.2$, respectively.)

$$Li_aM2_bPO_4 \quad \text{(Chemical Formula 2)}$$

(M2 represents at least one element selected from the group II to group XV. In the formula, a and b are values fall in ranges of $0 \leq a \leq 2.0$ and $0.5 \leq b \leq 2.0$, respectively.)

[Negative Electrode]

Figure 3:
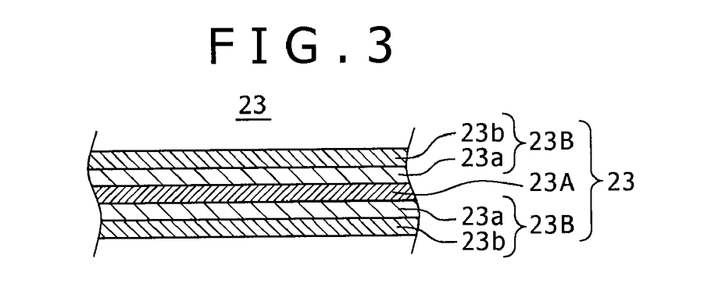
FIG. 3 is an enlarged sectional view showing a part of a negative electrode according to the first embodiment.

As shown in FIG. 3, the negative electrode 23 is composed of a band-form negative electrode current collector 23A as the electro-conductive base, and negative active material layers 23B formed on both surfaces of the negative electrode current collector 23A. Each negative active material layer 23B is composed of a first layer 23a provided on the negative electrode current collector 23A, and a second layer 23b provided on the first layer 23a. Alternatively, the negative electrode 23 may be configured as having a region, where the negative electrode active material layer 23B is provided, only on one surface of the negative electrode current collector 23A.

Similarly to the positive electrode 22, also the negative electrode 23 has the negative electrode lead 3 provided to one end thereof in the longitudinal direction. Copper (Cu), nickel (Ni) and so forth may be used as a material composing the negative electrode lead 3.

The negative electrode current collector 23A is composed of a metal foil such as copper (Cu) foil, nickel (Ni) foil or stainless steel (SUS) foil.

The first layer 23a is a graphite layer containing, as the negative active material, at least a graphitic material allowing lithium to be inserted therein and extracted therefrom, and optionally containing a binder such as polyvinylidene fluoride.

The graphitic material used herein as the negative active material preferably has an interplanar spacing of the (002) surfaces of 3.37 Å or smaller, and a crystallite thickness in the direction of C-axis of 150 Å or larger. The graphitic material showing these physical parameters is a carbonaceous material having a high crystallinity and a large true density, and can increase the electrode packing performance of the negative electrode 23, yielding a high energy density. The interplanar spacing $d_{002}$ of the (002) surfaces is typically obtained by calculation based on 2θ value determined by the tangential line method based on results of X-ray diffractometry. The Lc value is an $Lc_{002}$ value which expresses the crystallite thickness in the direction of c-axis of the (002) surface, and is typically obtained by calculation using Scherrer's equation based on a half value width of the (002) peak.

The graphitic material may be an artificial graphite or may be naturally-occurred graphite, so far as the physical parameters satisfy the above-described conditions. The artificial graphite can be obtained typically by carbonizing an organic material, followed by thermal treatment at higher temperatures, grinding, and classification.

Organic material adoptable as a starting material of the artificial graphite is represented by coal, pitch and so forth. The pitch is exemplified by those obtained from asphalt, coal tar, or tars obtained by high-temperature thermal cracking of ethylene bottom oil, crude oil and so forth, by distillation (vacuum distillation, normal pressure distillation, steam distillation), thermal poly-condensation, extraction, chemical poly-condensation and so forth, and other pitches produced in the process of carbonization of wood. Polymer compounds such as polyvinyl chloride resin, polyvinyl acetate, polyvinyl butyral and 3,5-dimethylphenol resin are also adoptable as the starting material for producing the pitch.

These coal, pitch and polymer compound exist in liquid form at around as high as 400° C. in the process of carbonization, and causes condensation or polycyclization among aromatic rings thereof, thereby given as a stack with an aligned structure, when they kept at that temperature. A solid carbon precursor, or semi-cokes, is formed when the product is further heated to approximately 500° C. or higher (liquid-phase carbonization process).

Besides these, also condensed polycyclic hydrocarbon compounds such as naphthalene, phenanthrene, anthracene, triphenylene, pyrene, perylene, pentaphene and pentacene, derivatives thereof (for example, carboxylic acid, carboxylic anhydride and carboxylic imide of these compounds), or mixture, condensed heterocyclic compounds such as acenaphthylene, indole, isoindole, quinoline, isoquinoline, quinoxaline, phthalazine, carbazole, acridine, phenazine, and phenanthridine, and still also derivatives of these compounds are adoptable as the starting material.

Using the above-described organic compounds as a starting material, a desired artificial graphite is produced by carbonizing one of the above-described organic compounds under flow of an inert gas such as nitrogen at 300° C. to 700° C. Thereafter, it is calcined under flow of an inert gas, at a rate of temperature elevation of 1 to 100° C./min, highest reachable temperature of 900° C. to 1500° C., and a keeping time of 0 to 30 hours or around, and further given a thermal treatment at 2000° C. or above, preferably 2500° C. or above. Of course, carbonization and calcination are omissible if occasions permit.

The produced graphite is ground and classified before it is provided as a material for the negative electrode. The grinding may take place before or after the calcination, or in the process of temperature elevation before the carbonization, providing that the thermal treatment for graphitization in this case takes place finally in a form of powder.

The second layer 23b is a hard carbon layer containing at least a non-graphitizable carbonaceous material (hard carbon) allowing lithium, as the negative active material, to be inserted therein and extracted therefrom, and optionally containing a binder such as polyvinylidene fluoride.

The non-graphitizable carbonaceous material used herein as the negative active material preferably has an interplanar spacing of the (002) surfaces of 3.44 Å or larger, and an Lc value of 80 Å or smaller. The non-graphitizable carbonaceous material showing these physical parameters has smaller crystallite and larger interplanar spacing of crystallite as compared with graphite, thereby allows lithium ion to be more readily inserted into small spaces between carbon layers and between crystallites, contributing to more rapid dispersibility of lithium ion, and thereby suppresses deposition of lithium even under high-load charging. The material can also suppress degradation of cycle performance, because it does not cause interlayer stretching nor deformation of negative electrode in association with insertion/extraction of lithium ion.

Organic materials used as the starting material for producing the non-graphitizable carbonaceous material includes, for example, conjugated resins such as furfuryl alcohol resin, furfural resin, furan resin, phenol resin, acrylic resin, halogenated vinyl resin, polyimide resin, polyamideimide resin, polyacetylene and poly(P-phenylene); and organic polymer-base compounds such as cellulose and its derivatives.

Also petroleum pitch having a specific H/C atomic ratio and introduced with oxygen-containing functional groups (so-called oxygen crosslinkage) can produce the non-graphitizable carbonaceous material by the process of solid phase carbonization, without being fused in the process of carbonization (at 400° C. or above), similarly to the above-described furan resin.

The petroleum pitch is obtained from asphalt or tars obtained by high-temperature thermal cracking of ethylene bottom oil, crude oil and so forth, by distillation (vacuum distillation, normal pressure distillation, steam distillation), thermal poly-condensation, extraction, chemical poly-condensation and so forth. The H/C atomic ratio of petroleum pitch now holds the key, which is necessarily adjusted to 0.6 to 0.8 for the purpose of obtaining the non-graphitizable carbonaceous material.

Using the above-described organic compounds as a starting material, the non-graphitizable carbonaceous artificial graphite can be obtained by carbonizing one of the above-described organic compounds under flow of an inert gas such as nitrogen at 300° C. to 700° C., then elevating the temperature at a rate of 1 to 100° C./min up to 900° C. to 1500° C., and keeping the product at the reached temperature for 0 to 30 hours or around. Of course, carbonization is omissible if occasions permit.

The negative active material layer 23B is composed of the first layer 23a and the second layer 23b, and thickness of the coated layer thereof falls in the range from 40 μm to 150 μm, for example. The thickness of the coated film means the thickness of the layer formed only on one surface of the negative electrode current collector 22a. Although there is no special limitation on a ratio of thickness of the first layer 23a and the second layer 23b of the negative active material layer 23B, higher ratios of the graphite layer composing the first layer 23a degrades the cycle performance, despite improved capacity. On the other hand, higher ratios of the hard carbon layer composing the second layer 23b degrades the capacity, despite improved cycle performance. For this reason, the ratio of thickness of the graphite layer as the first layer 23a and the hard carbon layer as the second layer 23b is preferably adjusted, for example, to 95:5 to 50:50, in view of suppressing excessive lowering in the capacity, and in improving the cycle performance. The negative active material layer 23B thus configured as having the double-layered structure, having the graphite layer as the first layer 23a and having the hard carbon layer as the second layer 23b, can attain a large capacity, and can suppress lithium deposition on the surface of the negative electrode 23 even under repetitive high-load charging.

[Electrolyte]

A gel electrolyte layer 25 composing the electrolyte contains an electrolyte solution, and a matrix polymer which serves as a support for the electrolyte solution, given in a form of so-called gel. The gel electrolyte layer 25 is preferable in view of ensuring a large ion conductivity, and capability of avoiding leakage of liquid from the battery.

A non-aqueous electrolyte solution composed of a non-aqueous solvent and an electrolyte salt dissolved therein is adoptable as the electrolyte solution. The non-aqueous solvent preferably contains, for example, at least ethylene carbonate (EC), because ethylene carbonate (EC) is less decomposable by the graphitic material. The non-aqueous solvent also preferably contains at least one species of chain-like carbonate esters selected from propylene carbonate (PC), dimethyl carbonate (DMC), ethyl methyl carbonate (EMC) and diethyl carbonate (DEC), because they can further improve the cycle performance.

The non-aqueous solvent further preferably contains at least either one of 2,4-difluoroanisole and vinylene carbonate. This is because 2,4-Difluoroanisole can improve the discharge capacity, and vinylene carbonate can further improve the cycle performance. Mixed use of these compounds is more preferable, because the discharge capacity and the cycle performance can be improved at the same time.

The non-aqueous solvent may further contain any one species, or two or more species selected from the group consisting of butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropylonitrile, N,N-dimethylformamide, N-methylpyrrolidinone, N-methyl oxazolidinone, N,N-dimethyl imidazolidinone, nitromethane, nitroethane, sulfolane, dimethyl sulfoxide and trimethyl phosphate.

Depending on the electrode to be combined, use of compounds included in the above-described group of non-aqueous solvent, having a part of, or all of, their hydrogen atoms substituted by fluorine atom(s), may improve reversibility of the electrode reaction. It is therefore allowable to use these compounds as occasions demand.

The electrolyte salt suitable herein includes $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, $LiCl$, $LiBF_{2(ox)}$, LiBOB and LiBr, wherein a single species thereof may be used, or two or more species thereof may be used in a mixed manner. Among others, $LiPF_6$ is preferable in view of obtaining large ion conductivity, and improving the cycle performance.

When the gel-form electrolyte is used, the gel-form electrolyte can be obtained by gelating an electrolyte solution, containing an electrolyte and an electrolyte salt mixed therein, using a matrix polymer. Any matrix polymer may be used so far as it is compatible with the non-aqueous electrolyte solution, containing a non-aqueous solvent and an electrolyte salt dissolved therein, and so far as it can be gelated. This sort of matrix polymer can be exemplified by polyvinylidene fluoride, copolymer of polyvinylidene fluoride hexafluoropropylene, copolymer of polyvinylidene fluoride and hexafluoropropylene and monochlorotrifluoroethylene, and copolymer of polyvinylidene fluoride and hexafluoropropylene and monomethyl maleate. Only a single species of such polymer may be used, or two or more species thereof may be used in a mixed manner.

[Separator]

The separator 24 is typically composed of a porous film made of a polyolefin-base material such as polyethylene (PE) or polypropylene (PP). The separator 24 may have a stacked structure of two or more species of porous films, or may be a porous film obtained by mixing and fusing two or more materials (polyethylene and polypropylene).

Thickness of the separator 24 is preferably adjusted to 3 μm to 20 μm. A thickness of the separator 24 of smaller than 3 μm may lower mechanical strength of the film and may induce internal shortcircuiting. The thickness exceeding 20 μm may distinctively degrade the capacity as the number of battery cycles increases. It may also lower the capacity due to reduced amount of packing of the active material, and may degrade the current characteristics due to lowered ion conductivity.

For the case where a stacked structure of two or more species of porous films is adopted, the separator is typically configured as having a double-layered structure composed of a base layer and a surface layer provided to one surface of the base layer, on the side thereof opposed to the positive electrode 22, or as having a three-layered structure composed of a base layer and surface layers provided on both surfaces thereof. The base layer used herein is typically composed of a polyethylene (PE) porous film, and the surface layer is typically composed of a polypropylene (PP) porous film.

(1-2) Method of Manufacturing Non-Aqueous Electrolyte Secondary Battery

The following paragraphs describe a method of manufacturing the non-aqueous electrolyte secondary battery according to the first embodiment.

[Step of Manufacturing Positive Electrode]

The positive electrode 22 is manufactured as described below. First, the above-described positive electrode active material, a binder, and an electro-conductive material are homogeneously mixed to produce a positive mixture, the positive mixture is dispersed into a solvent, and processed, if necessary, to produce a slurry using a ball mill, sand mill, biaxial kneader or the like. The solvent is not specifically limited so far as it is not labile to the electrode material, and can dissolve the binder, allowing use of both of inorganic solvents and organic solvents, wherein N-methyl-2-pyrrolidone (NMP) and the like are typically used. It is good enough that the positive electrode active material, the electro-conductive material, the binder and the solvent disperse with each other in a homogeneous manner, without limitation on the ratio of mixing. Next, the slurry is uniformly coated on both surfaces of the positive electrode current collector 22A by the doctor blade method or the like. The solvent is then dried off at high temperatures, and the product is subjected to compression molding using, for example, a roll press machine, to thereby form the positive electrode active material layer 22B, thereby the positive electrode 22 is manufactured.

The positive electrode 22 is bonded, for example, by spot welding or ultrasonic welding, with a positive electrode lead 2 at one end thereof in the longitudinal direction.

[Step of Manufacturing Negative Electrode]

The negative electrode 23 is manufactured as descried below. First of all, on the negative electrode current collector 23A, a graphite layer is formed as the first layer 23a. A graphitic material as the negative active material and a binder are mixed so as to produce a negative mixture, and the negative mixture is then dispersed into a solvent to thereby produce a slurry. In this process, a ball mill, sand mill, biaxial kneader or the like may be used, similarly to the case of positive mixture. The graphitic material applicable herein is such as having an interplanar spacing of the (002) surfaces of 3.37 Å or smaller, and an Lc value of 150 Å or larger, for example. The solvent used herein is, for example, N-methyl-2-pyrrolidone (NMP), methyl ethyl ketone or the like. Similarly to the case of positive electrode active material, ratio of mixing of the graphitic material, the binder and the solvent is not specifically limited. Next, the slurry is uniformly coated on both surfaces of the negative electrode current collector 23A typically by the doctor blade method. The solvent is then dried off at high temperatures, to thereby form the first layer 23a.

Next, on the first layer 23a, a hard carbon layer as the second layer 23b is formed. First, a non-graphitizable carbonaceous material as the negative active material and the binder are mixed to produce a negative mixture, and the negative mixture is then dispersed into a solvent such as N-methyl-2-pyrrolidone (NMP), to thereby produce a slurry. In this process, a ball mill, sand mill, biaxial kneader or the like may be used, similarly to the case of positive mixture. The non-graphitizable carbonaceous material applicable herein is such as having an interplanar spacing of the (002) surfaces of 3.44 Å or larger, and an Lc value of 80 Å or smaller, for example. There is no special limitation on ratio of mixing of the non-graphitizable carbonaceous material, the binder and the solvent, similarly to the case of positive electrode active material. The slurry is then coated by the doctor blade method on the first layer 23a formed on the negative electrode current collector 23A, the solvent is then dried off at high temperatures, to thereby form the second layer 23b. Thereafter, the product is subjected to compression molding using, for example, a roll press machine, to thereby form the negative electrode active material layer 23B composed of the first layer 23a and the second layer 23b, thereby the negative electrode 23 is manufactured.

The coating machine herein is not specifically limited, allowing use of any types designed for die coating such as slide coating and extrusion coating, reverse roll coating, gravure coating, knife coating, kiss coating, micro-gravure coating, rod coating and blade coating. Also methods of drying are not specifically limited, and can be performed by allowing the product to stand still, or by using an air blow drier, hot air drier, infrared heater, far-infrared heater and the like.

Also the negative electrode 23 is bonded, by spot welding or ultrasonic welding, for example, with a negative electrode lead 3 at one end thereof in the longitudinal direction.

[Process of Assembling Battery]

Next, each of the positive electrode 22 and the negative electrode 23 manufactured as described in the above is coated with a precursory solution containing a solvent, an electrolyte salt, a polymer compound and a mixed solvent, and the mixed solvent is then vaporized off to thereby form a gel electrolyte layer 25.

Next, the positive electrode 22 and the negative electrode 23, having the gel electrolyte layer 25 respectively formed thereon, are stacked while placing the separator 24 in between, and the obtained stack is then rolled up in the longitudinal direction thereof, to thereby form a rolled-type battery element 10.

Next, the casing 7 composed of a laminate film is processed by deep drawing to thereby form the battery element housing portion 6, the battery element 10 is placed in the battery element housing portion 6, the unprocessed portion of the casing 7 is folded up above the battery element housing portion 6, and the outer circumferential portion of the battery element housing portion 6 is fused by heating and sealed. By these procedures, the non-aqueous electrolyte secondary battery according to the first embodiment is manufactured.

When the non-aqueous electrolyte secondary battery configured as described in the above is charged, lithium ion extracted from the positive electrode 22 is inserted through the gel electrolyte layer 25 into the negative electrode 23. On the other hand, when the battery is discharged, lithium ion extracted from the negative electrode 23 is inserted through the gel electrolyte layer 25 into the positive electrode 22. The negative active material layer 23B of the non-aqueous electrolyte secondary battery has the double-layered structure composed of the first layer 23a and the second layer 23b, and the first layer is composed of a graphite layer, and can attain a large capacity. By adopting a hard carbon layer for composing the second layer, lithium deposition on the surface of the negative electrode can be suppressed, and thereby the degradation in the cycle performance under repetitive high-load charging can be suppressed.

The non-aqueous electrolyte secondary battery as described in the above may be used as of 4.20-V model characterized by an open circuit voltage of 2.5 V or more and 4.20 V or less, per a pair of positive electrode and negative electrode in the full-charge state, or may be used as of high-voltage model with an open circuit voltage of 4.25 V or more and 4.55 V or less, preferably 4.25 V or more 4.50 V or less. The battery of high-voltage model can now make a full use of capacity of the positive electrode active material which has not fully been used previously, so that the amount of released lithium per unit mass of the positive active material increases, allowing larger capacity and larger energy density. On the other hand, lithium may otherwise become more likely to deposit on the surface of the negative electrode, this non-aqueous electrolyte secondary battery adopts a hard carbon layer for the second layer 23b, and can thereby suppress lithium deposition onto the surface of the negative electrode after repetitive high-load charging, and can improve the cycle performance, even when it was configured as of high-voltage model.

Figure 4:
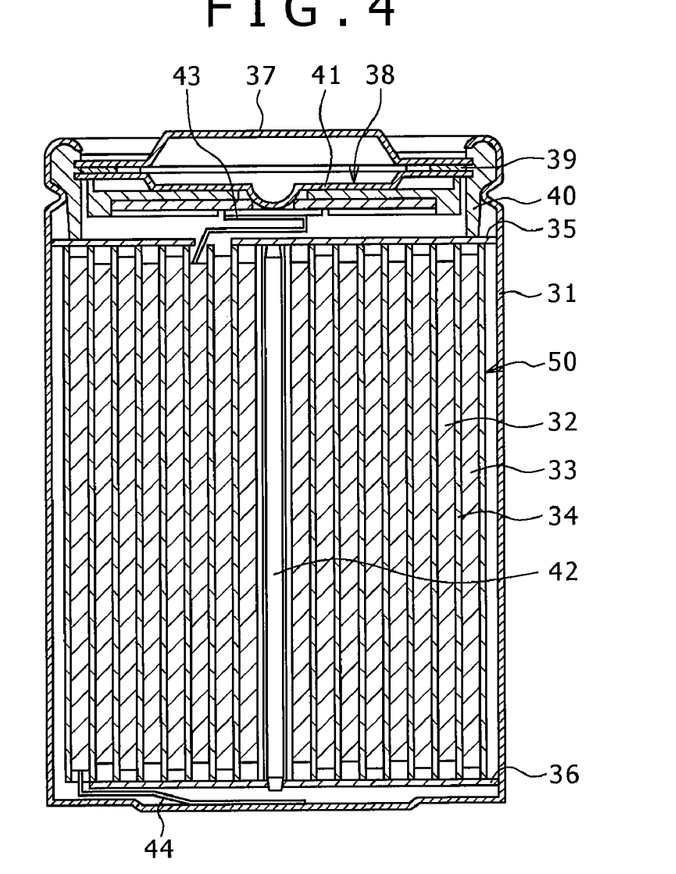
FIG. 4 is a schematic drawing showing a structure of a non-aqueous electrolyte secondary battery according to a second embodiment.

(2) Second Embodiment (2-1) Configuration of Non-Aqueous Electrolyte Secondary Battery FIG. 4 shows a sectional structure of a non-aqueous electrolyte secondary battery according to the second embodiment. The non-aqueous electrolyte secondary battery is of so-called cylinder type, and has, in a nearly-hollow cylindrical battery can 31 thereof, an electrode roll 50 composed of a band-like positive electrode 32 and a band-like negative electrode 33 rolled up while placing a separator 34 in between. The separator 34 is impregnated with an electrolyte solution.

The battery can 31 is composed of, for example, a nickel (Ni)-plated iron (Fe) sheet, having one end closed, and the other end opened. In the battery can 31, there are disposed a pair of insulating plates 35, 36 so as to hold the electrode roll 50 in between, normally to the circumferential surface of the roll.

The battery can 31 is attached, at the opened end thereof, with a battery lid 37, and a safety valve mechanism 38 and a positive temperature coefficient (PTC) element 39 provided inside the battery can 37, as being caulked while placing a gasket 40 in between, so as to seal the content of the battery can 31. The battery lid 37 is typically composed of a material same as that composing the battery can 31. The safety valve mechanism 38 is electrically connected through the positive temperature coefficient element 39 to the battery lid 37, configured so as to allow a disk plate 41 to invert and thereby to electrically disconnect the battery lid 37 from the electrode roll 50, when the internal pressure of the battery exceeds a predetermined level due to internal shortcircuiting or heating from the external. The positive temperature coefficient element 39 acts as limiting current by elevating its resistivity value when temperature rises, so as to prevent abnormal heat generation due to large current. The gasket 40 is typically composed of an insulating material, having asphalt coated on the surface thereof.

The electrode roll 50 is rolled up typically as being centered round a center pin 42. The positive electrode 32 of the electrode roll 50 is bonded with a positive electrode lead 43 composed of aluminum (Al), for example, and the negative electrode 33 is bonded with a negative electrode lead 44 composed of nickel (Ni), for example. The positive electrode lead 43 is electrically connected with the battery lid 37 as being welded to the safety valve mechanism 38, and the negative electrode lead 44 is electrically connected to the battery can 31 as being welded thereto.

Figure 5:
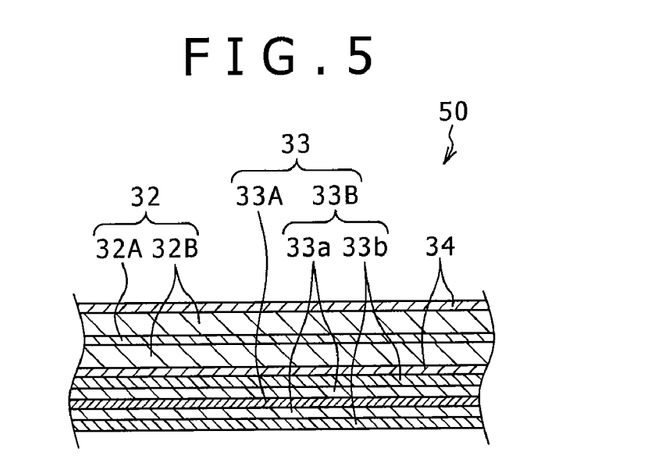
FIG. 5 is an enlarged sectional view showing a part of the battery element shown in FIG. 4.

The positive electrode 32 is composed of, typically as shown in FIG. 5, a band-like positive electrode current collector 32A, and positive electrode active material layers 32B formed on both surfaces of the positive electrode current collector 32A.

The negative electrode 33 is composed of, typically as shown in FIG. 5, a band-like negative electrode current collector 33A, and negative active material layers 33B formed on both surfaces of the negative electrode current collector 33A. The negative active material layer 33B is composed of, similarly to that described in the first embodiment, a first layer 33a provided on the negative electrode current collector 33A, and a second layer 33b provided on the first layer, wherein the first layer 33a is a graphite layer, and the second layer 33b is a hard carbon layer.

The positive electrode current collector 32A, the positive electrode active material layer 32B, the negative electrode current collector 33A, and the negative active material layer 33B are similar to the positive electrode current collector 22A, the positive electrode active material layer 22B, the negative electrode current collector 23A, and the negative active material layer 23B, respectively, described above in the first embodiment. Also the separator 34 is similar to the separator 24 described above in the first embodiment.

[Electrolyte Solution]

A non-aqueous electrolyte solution containing an electrolyte salt dissolved in a non-aqueous solvent may be used as the electrolyte solution. Configuration of the electrolyte solution (liquid-form solvent, electrolyte salt) is similar to that described above in the first embodiment.

(2-2) Method of Manufacturing Non-Aqueous Electrolyte Secondary Battery

Next, a method of manufacturing the non-aqueous electrolyte secondary battery according to the second embodiment is explained.

[Step of Assembling Battery]

The positive electrode 32 and the negative electrode 33 manufactured similarly to those described in the first embodiment are rolled up, while placing the separator 34 in between, the end portion of the positive electrode lead 43 is welded to the safety valve mechanism 38, and the end portion of the negative electrode lead 44 is welded to the battery can 31. Thus-rolled positive electrode 32 and the negative electrode 33 are housed in the battery can 31, while being held between a pair of insulating plates 35, 36.

Next, an electrolyte solution is poured into the battery can 31, so as to allow the electrolyte solution to impregnate into the separator 34. The battery lid 37, the safety valve mechanism 38 and the positive temperature coefficient element 39 are caulked with the opened edge of the battery can 31 while placing the gasket 40 in between. By these procedures, the non-aqueous electrolyte secondary battery according to the second embodiment of the present invention is manufactured.

EXAMPLES

Paragraphs below specifically explain the present embodiments referring to Examples. It is to be understood that the present embodiments are not limited to these Examples.

Discussion below describes studies on the batteries adopting the negative electrodes, each of which having a graphite layer as the first layer, and a hard carbon layer as the second layer, varied in the ratio of thickness of the first layer and the second layer. First, methods of manufacturing the negative electrodes in Example 1-1 to Example 1-5, Comparative Example 1-1 and Comparative Example 1-2 are explained.

Example 1-1

Ninety percent by mass of an artificial graphite powder having a mean grain size of 30 μm, used as the negative active material of the first layer, and 10% by mass of polyvinylidene fluoride (PVdF), used as the binder, were mixed, dispersed into N-methyl-2-pyrrolidone (NMP) as the solvent, the mixture was coated on both surfaces of the negative electrode current collector composed of a band-like copper foil of 10 µm thick, and allowed to dry, to thereby form the graphite layer as the first layer.

Next, 90% by mass of hard carbon, which is a non-graphitizable carbonaceous material used as the negative active material of the second layer, and 10% by mass of polyvinylidene fluoride (PVdF) as a binder were mixed, dispersed into N-methyl-2-pyrrolidone (NMP) as the solvent, the mixture was coated on the first layers formed on both surfaces of the negative electrode current collector, and allowed to dry, to thereby form the hard carbon layers as the second layer. Thickness of the negative active material layer composed of the coated first layer and the coated second layer was adjusted to 100 µm. The ratio of thickness of the first layer and the second layer in the negative active material layer was adjusted to 95:5. More specifically, the thickness of the first layer was 95 µm, and the thickness of the second layer was 5 µm. Thereafter, the product was subjected to compression molding using a roll press machine, and the molded product was cut into 44 mm×460 mm bands. A nickel negative electrode lead was then bonded on one end of the negative electrode current collector, to thereby manufacture a negative electrode of Example 1-1.

Example 1-2

A negative electrode of Example 1-2 was manufactured similarly to that described in Example 1-1, except that the ratio of thickness of the first layer and the second layer in the negative active material layer was adjusted to 90:10.

Example 1-3

A negative electrode of Example 1-3 was manufactured similarly to that described in Example 1-1, except that the ratio of thickness of the first layer and the second layer in the negative active material layer was adjusted to 65:35.

Example 1-4

A negative electrode of Example 1-4 was manufactured similarly to that described in Example 1-1, except that the ratio of thickness of the first layer and the second layer in the negative active material layer was adjusted to 50:50.

Example 1-5

A negative electrode of Example 1-5 was manufactured similarly to that described in Example 1-1, except that the ratio of thickness of the first layer and the second layer in the negative active material layer was adjusted to 25:75.

Comparative Example 1-1

A negative electrode of Comparative Example 1-1 was manufactured similarly to that described in Example 1-1, except that the ratio of thickness of the first layer and the second layer in the negative active material layer was adjusted to 100:0, in other words, only a graphite layer was formed on the negative electrode current collector so as to give the negative active material layer as having a single-layered structure.

Comparative Example 1-2

A negative electrode of Comparative Example 1-2 was manufactured similarly to that described in Example 1-1, except that the ratio of thickness of the first layer and the second layer in the negative active material layer was adjusted to 0:100, in other words, only a hard carbon layer was formed on the negative electrode current collector so as to give the negative active material layer as having a single-layered structure.

Using the negative electrodes thus-manufactured in Example 1-1 to Example 1-5, Comparative Example 1-1 and Comparative Example 1-2, secondary batteries shown in FIG. 1 and FIG. 2 were manufactured according to the procedures below.

[Positive Electrode]

A positive mixture was prepared by mixing 90% by mass of lithium cobalt oxide ($LiCoO_2$) powder, 4% by mass of carbon black as the electro-conductive material, and 6% by mass of polyvinylidene fluoride (PVdF) as the binder. The positive mixture was then dispersed into N-methyl-2-pyrrolidone as the solvent to thereby prepare a positive mixture slurry, and the slurry was uniformly coated on both surfaces of the positive electrode current collector composed of a band-like aluminum foil of 14 µm thick. Next, the product was allowed to dry, and subjected to compression molding using a roll press machine to thereby produce a positive electrode active material layer, and the molded product was cut into 42.5 mm×455 mm bands. An aluminum positive electrode lead was then bonded on one end of the positive electrode current collector.

[Gel Electrolyte]

Into a solvent containing ethylene carbonate (EC) and propylene carbonate (PC) mixed therein in a mass ratio of EC:PC=40:60, lithium hexafluorophosphate ($LiPF_6$) as the electrolyte salt was dissolved in a concentration of 1.0 mol/kg, to thereby prepare an electrolyte solution. The electrolyte solution was then mixed with polyvinylidene fluoride (PVdF), copolymerized with hexafluoropropylene (HFP) in a ratio of 7%, as a matrix polymer in a mass ratio of polymer:electrolyte solution=1:6, while using dimethyl carbonate (DMC) as the solvent, to thereby prepare a sol-form electrolyte. The electrolyte was then coated on the positive electrode and the negative electrode, the solvent was allowed to vaporize, to thereby form gel electrolyte layers.

[Step of Assembling Battery]

The positive electrode and the negative electrode having gel electrolyte layer already formed thereon were stacked, while placing on both surfaces of these electrodes a porous polyethylene separators having a thickness of 12 µm and a pore ratio of 35%, and rolled up to obtain a battery element. Next, the battery element was surrounded by an aluminum laminate film, the circumference of the battery element was sealed, to thereby manufacture the non-aqueous electrolyte secondary battery.

The non-aqueous electrolyte secondary battery herein is designed, when subjected to the standard charging using a standard charger, so as to adjust the full charge voltage under actual operation to 4.20 V, based on adjustment of the amount of positive electrode active material and the amount of negative active material (4.20-V model). It is to be understood that the standard charging is to charge the battery under an ambient temperature of 23° C. at 0.5-A constant current, discontinued at a predetermined voltage of 4.20 V, and then to further charge the battery at a constant voltage until the total charge time reaches 2.5 hours.

The non-aqueous electrolyte secondary battery of Example 1-1 to Example 1-5, Comparative Example 1-1 and Comparative Example 1-2 manufactured as described in the above were tested and evaluated as follows. In the test and evaluation, 5 samples were measured in the individual tests and at the individual levels, and evaluated by the mean values.

In the methods of evaluation described below, 1.0 C means a current value capable of discharging the rated capacity of battery over 1 hour, exemplifying that 0.2 C, 0.5 C and 3.0 C mean current values capable of discharging the rated capacity of battery over 5 hours, 2 hours and 20 minutes, respectively. Because measured capacities of the non-aqueous electrolyte secondary batteries of the above-described Examples and Comparative Examples were found to range from 793 mAh to 851 mAh, the measurement was made assuming the rated capacity as 800 mAh. That is, given the rated capacity of 800 mAh, 0.2 C=160 mA, 1.0 C=800 mA and 3.0 C=2.40 A hold.

(A) Initial Capacity

The non-aqueous electrolyte secondary batteries of Examples and Comparative Examples described in the above were subjected to the initial charging and initial discharging, in order to measure the initial capacity. First, the batteries were charged at a constant current of 0.15 C (i.e., 120 mA), discontinued at a charge voltage of 4.20 V, and then further charged at a constant voltage until the total charge time reaches to 12 hours, or until the current value is attenuated down to 0.002 C (i.e., 1.6 mA), either of which attained earlier being selected, and the quantity of electricity required herein was defined as charge capacity. The batteries were then discharged at 0.2 C, discontinued when a voltage of 3.0 V was attained, and evaluation was made assuming the discharge capacity measured at that point of time as the initial capacity. Initial capacity of 700 mAh or above was evaluated as being acceptable.

(B) Capacity Retention Ratio after 200 Cycles

The non-aqueous electrolyte secondary batteries of Examples and Comparative Examples described in the above were charged respectively at charge rates varied among 1.0 C, 1.5 C and 2.0 C, and capacity retention ratios after 200 cycles were determined.

(B-1) Capacity Retention Ratio at 1.0 C

First, the batteries were charged at a constant current of 1.0 C, ended when a cut-off voltage of charging of 4.20 V, which is the upper limit, was reached, and then further charged at a constant voltage until the total charge time reaches 2.5 hours. The batteries were then discharged at a constant current of 1.0 C, discontinued when the voltage dropped down to 2.5 V, and the discharge capacity at that point of time was measured. This sort of charge-discharge cycle was repeated 200 times, and time-dependent changes in the discharge capacity obtained for every cycle were observed. The capacity retention ratio after 200 cycles was calculated based on the equation 1 below, using discharge capacities obtained after the 5th cycle and the 200th cycle. Values of the capacity retention ratio after 200 cycles of 90% or above, under charging at 1.0 C, were evaluated as being acceptable. Values of 90% or above are generally required for specifications of portable electronic instruments at present.

$$\text{Capacity retention ratio after 200 cycles [\%]} = \{(\text{discharge capacity after the 200th cycle/discharge capacity after 5th cycle}) \times 100\} [\%] \quad \text{(Equation 1)}$$

(B-2) Capacity Retention Ratio at 1.5 C

Capacity retention ratio after the 200th cycle at 1.5 C was determined similarly to as described above in (B-1) Capacity Retention Ratio at 1.0 C, except that the batteries were charged at constant current and constant voltage under a condition of 1.5 C. Values of the capacity retention ratio after 200 cycles of 80% or above, under charging at 1.5 C, were evaluated as being acceptable.

(B-3) Capacity Retention Ratio at 2.0 C

Capacity retention ratio after the 200th cycle at 1.5 C was determined similarly to as described above in (B-1) Capacity Retention Ratio at 1.0 C, except that the batteries were charged at constant current and constant voltage under a condition of 2.0 C. Values of the capacity retention ratio after 200 cycles of 70% or above, under charging at 2.0 C, were evaluated as being acceptable.

(C) Lithium Deposition

The batteries, after being determined in the capacity retention ratio after the 200th cycle, were charged up to 4.20 V. The batteries were then disassembled, and lithium deposition on the surface of the negative electrodes was visually observed.

Results of evaluation of ratio of thickness of the first layer and the second layer in the negative active material layer, capacity retention ratio after the 200th cycle, lithium deposition, and initial capacity of the non-aqueous electrolyte secondary batteries of Example 1-1 to Example 1-5, Comparative Example 1-1 and Comparative Example 1-2 were shown in Table 1.

TABLE 1

Charging voltage: 4.20 V

|  | CHARGING RATE [C] | FILM THICKNESS RATIO [1st LAYER (Graphite):2nd LAYER (Hard Carbon)] | CAPACITY RETENTION RATIO AFTER 200 CYCLES [%] | LITHIUM DEPOSITION | INITIAL CAPACITY [mAh] |
|---|---|---|---|---|---|
| Comparative Example 1-1 | 1.0 | 100:0 | 90 | no | 810 |
| Example 1-1 | 1.0 | 95:5 | 91 | no | 792 |
| Example 1-2 | 1.0 | 90:10 | 92 | no | 784 |
| Example 1-3 | 1.0 | 65:35 | 92 | no | 772 |
| Example 1-4 | 1.0 | 50:50 | 93 | no | 756 |
| Example 1-5 | 1.0 | 25:75 | 93 | no | 740 |
| Comparative Example 1-2 | 1.0 | 0:100 | 93 | no | 721 |
| Comparative Example 1-1 | 1.5 | 100:0 | 78 | yes | 810 |
| Example 1-1 | 1.5 | 95:5 | 81 | no | 792 |
| Example 1-2 | 1.5 | 90:10 | 82 | no | 784 |
| Example 1-3 | 1.5 | 65:35 | 83 | no | 772 |
| Example 1-4 | 1.5 | 50:50 | 83 | no | 756 |
| Example 1-5 | 1.5 | 25:75 | 84 | no | 740 |

TABLE 1-continued

Charging voltage: 4.20 V

|  | CHARGING RATE [C] | FILM THICKNESS RATIO [1st LAYER (Graphite):2nd LAYER (Hard Carbon)] | CAPACITY RETENTION RATIO AFTER 200 CYCLES [%] | LITHIUM DEPOSITION | INITIAL CAPACITY [mAh] |
|---|---|---|---|---|---|
| Comparative Example 1-2 | 1.5 | 0:100 | 84 | no | 721 |
| Comparative Example 1-1 | 2.0 | 100:0 | 67 | yes | 810 |
| Example 1-1 | 2.0 | 95:5 | 72 | no | 792 |
| Example 1-2 | 2.0 | 90:10 | 73 | no | 784 |
| Example 1-3 | 2.0 | 65:35 | 74 | no | 772 |
| Example 1-4 | 2.0 | 50:50 | 74 | no | 756 |
| Example 1-5 | 2.0 | 25:75 | 75 | no | 740 |
| Comparative Example 1-2 | 2.0 | 0:100 | 75 | no | 721 |

It was known from Table 1 that Example 1-1 to Example 1-5 showed no lithium deposition under high-load charging at the charge rate raised to as high as 1.5 C and 2.0 C, proving suppression of degradation in the capacity retention ratio. More specifically, it was found that degradation in the cycle performance can be suppressed even under high-load charging, by using a graphite layer as the first layer, and by using a hard carbon layer as the second layer. It was also found that the initial capacity decreases as the ratio of thickness of the hard carbon layer used as the second layer increases. It was therefore concluded that, in view of suppressing excessive lowering in the capacity and of suppressing lowering in the capacity retention ratio, the ratio of thickness of the graphite layer as the first layer and the hard carbon layer as the second layer is preferably adjusted to 95:5 to 50:50, for example.

Next, batteries adopting the negative electrodes having a hard carbon layer as the first layer and a graphite layer as the second layer, were manufactured while varying the ratio of thickness of the first layer and the second layer, and examined.

Comparative Example 2-1

A negative electrode of Comparative Example 2-1 was manufactured similarly to that described in Example 1-1, except that a hard carbon layer was formed as the first layer and a graphite layer was formed as the second layer. The thickness of the negative active material layer was 100 μm, thereby the ratio of thickness of the first layer and the second layer in the negative active material layer was given as 95:5.

Comparative Example 2-2

A negative electrode of Comparative Example 2-2 was manufactured similarly to that described in Example 2-1, except that the ratio of thickness of the first layer and the second layer in the negative active material layer was adjusted to 90:10.

Comparative Example 2-3

A negative electrode of Comparative Example 2-3 was manufactured similarly to that described in Example 2-1, except that the ratio of thickness of the first layer and the second layer in the negative active material layer was adjusted to 65:35.

Comparative Example 2-4

A negative electrode of Comparative Example 2-4 was manufactured similarly to that described in Example 2-1, except that the ratio of thickness of the first layer and the second layer in the negative active material layer was adjusted to 50:50.

Comparative Example 2-5

A negative electrode of Comparative Example 2-5 was manufactured similarly to that described in Example 2-1, except that the ratio of thickness of the first layer and the second layer in the negative active material layer was adjusted to 25:75.

The non-aqueous electrolyte secondary batteries shown in FIG. 1 and FIG. 2 were manufactured in a manner similar to that described in Example 1-1, using thus-manufactured negative electrodes of Comparative Example 2-1 to Comparative Example 2-5. The non-aqueous electrolyte secondary batteries of Comparative Example 2-1 to Comparative Example 2-5 manufactured in the above were then evaluated similarly to Example 1-1, with respect to (A) initial capacity, (B) capacity retention ratio after the 200th cycle, and (C) lithium deposition.

Results of evaluation of ratio of thickness of the first layer and the second layer in the negative active material layer, capacity retention ratio after the 200th cycle, lithium deposition, and initial capacity of the non-aqueous electrolyte secondary batteries of Comparative Example 2-1 to Comparative Example 2-5, Comparative Example 1-1 and Comparative Example 1-2 were shown in Table 2.

TABLE 2

| | | Charging voltage: 4.20 V | | | |
|---|---|---|---|---|---|
| | CHARGING RATE [C] | FILM THICKNESS RATIO [1st LAYER (Hard Carbon):2nd LAYER (Graphite)] | CAPACITY RETENTION RATIO AFTER 200 CYCLES [%] | LITHIUM DEPOSITION | INITIAL CAPACITY [mAh] |
| Comparative Example 1-2 | 1.0 | 100:0 | 93 | no | 721 |
| Comparative Example 2-1 | 1.0 | 95:5 | 92 | no | 728 |
| Comparative Example 2-2 | 1.0 | 90:10 | 91 | no | 735 |
| Comparative Example 2-3 | 1.0 | 65:35 | 91 | no | 747 |
| Comparative Example 2-4 | 1.0 | 50:50 | 91 | no | 756 |
| Comparative Example 2-5 | 1.0 | 25:75 | 90 | no | 778 |
| Comparative Example 1-1 | 1.0 | 0:100 | 90 | no | 810 |
| Comparative Example 1-2 | 1.5 | 100:0 | 84 | no | 721 |
| Comparative Example 2-1 | 1.5 | 95:5 | 78 | yes | 728 |
| Comparative Example 2-2 | 1.5 | 90:10 | 77 | yes | 735 |
| Comparative Example 2-3 | 1.5 | 65:35 | 77 | yes | 747 |
| Comparative Example 2-4 | 1.5 | 50:50 | 77 | yes | 756 |
| Comparative Example 2-5 | 1.5 | 25:75 | 76 | yes | 778 |
| Comparative Example 1-1 | 1.5 | 0:100 | 76 | yes | 810 |
| Comparative Example 1-2 | 2.0 | 100:0 | 75 | no | 721 |
| Comparative Example 2-1 | 2.0 | 95:5 | 68 | yes | 728 |
| Comparative Example 2-2 | 2.0 | 90:10 | 68 | yes | 735 |
| Comparative Example 2-3 | 2.0 | 65:35 | 68 | yes | 747 |
| Comparative Example 2-4 | 2.0 | 50:50 | 68 | yes | 756 |
| Comparative Example 2-5 | 2.0 | 25:75 | 67 | yes | 778 |
| Comparative Example 1-1 | 2.0 | 0:100 | 67 | yes | 810 |

It was known from Table 2, that Comparative Example 2-1 to Comparative Example 2-5, and Comparative Example 1-2 showed lithium deposition on the surface of the negative electrode under high-load charging at a charging rate raised as high as 1.5 C and 2.0 C, resulted in lowered capacity retention ratio. More specifically, it was found that the cycle performance degraded under the high-load charging, when the second layer disposed on the surface side of the negative electrode is composed of a graphite layer. Based on the results shown in Table 1 and Table 2, it was found that the cycle performance can be improved even under high-load charging, if the negative active material layer is composed as having a double-layered structure, using a graphite layer as the first layer and using a hard carbon layer as the second layer.

Next, batteries adopting the negative electrodes having a single-layered structure, in which a graphitic material and a non-graphitizable carbonaceous material are mixed according to various ratios of mixing to configure the negative active material, were manufactured and examined.

Comparative Example 3-1

Ninety percent by mass of negative active material, having 5% percent by mass of hard carbon, which is a non-graphitizable carbonaceous material used in Example 1-1, and 95% by mass of artificial graphite powder used in Example 1-1 homogeneously mixed therein, and 10% by mass of polyvinylidene fluoride (PVdF) as the binder were mixed. The mixture was dispersed into N-methyl-2-pyrrolidone (NMP) as the solvent, coated on both surfaces of the negative electrode current collector 3A composed of a band-like copper foil of 10 μm thick, to a thickness of coating of 100 μm, allowed to dry, to thereby form a single-layered negative active material layer. A negative electrode of Comparative Example 3-1 was manufactured similarly to as described in Example 1-1, except that the above-described procedures were adopted.

Comparative Example 3-2

A negative electrode of Comparative example 3-2 was manufactured similarly to that described in Comparative Example 3-1, except that a negative active material, having 10% by mass of hard carbon and 90% by mass of artificial graphite powder homogenously mixed therein, was used.

Comparative Example 3-3

A negative electrode of Comparative example 3-3 was manufactured similarly to that described in Comparative Example 3-1, except that a negative active material, having 35% by mass of hard carbon and 65% by mass of artificial graphite powder homogenously mixed therein, was used.

Comparative Example 3-4

A negative electrode of Comparative example 3-4 was manufactured similarly to that described in Comparative Example 3-1, except that a negative active material, having 50% by mass of hard carbon and 50% by mass of artificial graphite powder homogenously mixed therein, was used.

Comparative Example 3-5

A negative electrode of Comparative example 3-5 was manufactured similarly to as described in Comparative Example 3-1, except that a negative active material, having 75% by mass of hard carbon and 25% by mass of artificial graphite powder homogenously mixed therein, was used.

The non-aqueous electrolyte secondary batteries shown in FIG. 1 and FIG. 2 were manufactured in a manner similar to that described in Example 1-1, using thus-manufactured negative electrodes of Comparative Example 3-1 to Comparative Example 3-5. The non-aqueous electrolyte secondary batteries of Comparative Example 3-1 to Comparative Example 3-5 manufactured in the above were then evaluated similarly to Example 1-1, with respect to (A) initial capacity, (B) capacity retention ratio after the 200th cycle, and (C) lithium deposition.

Results of evaluation of ratio of thickness of the first layer and the second layer in the negative active material layer, capacity retention ratio after the 200th cycle, lithium deposition, and initial capacity of the non-aqueous electrolyte secondary batteries of Comparative Example 3-1 to Comparative Example 3-5, Comparative Example 1-1 and Comparative Example 1-2 were shown in Table 3.

TABLE 3

| | | NEGATIVE ELECTRODE ACTIVE MATERIAL | | CAPACITY | | |
|---|---|---|---|---|---|---|
| | CHARGING RATE [C] | HARD CARBON PERCENTAGE [%] | GRAPHITE PERCENTAGE [%] | RETENTION RATIO AFTER 200 CYCLES [%] | LITHIUM DEPOSITION | INITIAL CAPACITY [mAh] |
| Comparative Example 1-1 | 1.0 | 0 | 100 | 90 | no | 810 |
| Comparative Example 3-1 | 1.0 | 5 | 95 | 90 | no | 791 |
| Comparative Example 3-2 | 1.0 | 10 | 90 | 90 | no | 784 |
| Comparative Example 3-3 | 1.0 | 35 | 65 | 90 | no | 772 |
| Comparative Example 3-4 | 1.0 | 50 | 50 | 91 | no | 755 |
| Comparative Example 3-5 | 1.0 | 75 | 25 | 91 | no | 741 |
| Comparative Example 1-2 | 1.0 | 100 | 0 | 93 | no | 721 |
| Comparative Example 1-1 | 1.5 | 0 | 100 | 78 | yes | 810 |
| Comparative Example 3-1 | 1.5 | 5 | 95 | 78 | yes | 791 |
| Comparative Example 3-2 | 1.5 | 10 | 90 | 78 | yes | 784 |
| Comparative Example 3-3 | 1.5 | 35 | 65 | 79 | yes | 772 |
| Comparative Example 3-4 | 1.5 | 50 | 50 | 79 | yes | 755 |
| Comparative Example 3-5 | 1.5 | 75 | 25 | 79 | yes | 741 |
| Comparative Example 1-2 | 1.5 | 100 | 0 | 84 | no | 721 |
| Comparative Example 1-1 | 2.0 | 0 | 100 | 67 | yes | 810 |
| Comparative Example 3-1 | 2.0 | 5 | 95 | 67 | yes | 791 |
| Comparative Example 3-2 | 2.0 | 10 | 90 | 67 | yes | 784 |
| Comparative Example 3-3 | 2.0 | 35 | 65 | 67 | yes | 772 |
| Comparative Example 3-4 | 2.0 | 50 | 50 | 68 | yes | 755 |
| Comparative Example 3-5 | 2.0 | 75 | 25 | 68 | yes | 741 |
| Comparative Example 1-2 | 2.0 | 100 | 0 | 75 | no | 721 |

It was known from Table 3, that Comparative Example 3-1 to Comparative Example 3-5, using a mixture of hard carbon and graphite as the negative active material, showed lithium deposition on the surface of the negative electrode under high-load charging at a charging rate raised as high as 1.5 C and 2.0 C, resulted in lowered capacity retention ratio. In other words, it was found that an effect of improving the cycle performance under high-load charging cannot be obtained, only simply by mixing hard carbon to the negative active material.

Next, batteries adopting the negative electrodes having a hard carbon layer as the first layer and again a graphite layer as the second layer were manufactured while varying the ratio of thickness of the first layer and the second layer, and examined.

Comparative Example 4-1

A negative electrode of Comparative Example 4-1 was manufactured similarly to that described in Example 1-1, except that a graphite layer was formed as the first layer and a hard carbon layer was formed as the second layer. The thickness of the negative active material layer was 100 μm, thereby the ratio of thickness of the first layer and the second layer in the negative active material layer was given as 95:5.

Comparative Example 4-2

A negative electrode of Comparative Example 4-2 was manufactured similarly to that described in Comparative Example 4-1, except that the ratio of thickness of the first layer and the second layer in the negative active material layer was adjusted to 90:10.

Comparative Example 4-3

A negative electrode of Comparative Example 4-3 was manufactured similarly to that described in Comparative Example 4-1, except that the ratio of thickness of the first layer and the second layer in the negative active material layer was adjusted to 65:35.

Comparative Example 4-4

A negative electrode of Comparative Example 4-4 was manufactured similarly to that described in Comparative Example 4-1, except that the ratio of thickness of the first layer and the second layer in the negative active material layer was adjusted to 50:50.

Comparative Example 4-5

A negative electrode of Comparative Example 4-5 was manufactured similarly to that described in Comparative Example 4-1, except that the ratio of thickness of the first layer and the second layer in the negative active material layer was adjusted to 25:75.

The non-aqueous electrolyte secondary batteries shown in FIG. 1 and FIG. 2 were manufactured in a manner similar to Example 1-1, using thus-manufactured negative electrodes of Comparative Example 4-1 to Comparative Example 4-5. The non-aqueous electrolyte secondary batteries of Comparative Example 4-1 to Comparative Example 4-5 manufactured in the above were then evaluated similarly to as in Example 1-1, with respect to (A) initial capacity, (B) capacity retention ratio after the 200th cycle, and (C) lithium deposition.

Results of evaluation of ratio of thickness of the first layer and the second layer in the negative active material layer, capacity retention ratio after the 200th cycle, lithium deposition, and initial capacity of the non-aqueous electrolyte secondary batteries of Comparative Example 4-1 to Comparative Example 4-5, Comparative Example 1-1 and Comparative Example 1-2 were shown in Table 4.

TABLE 4

| | Charging voltage: 4.20 V | | | | |
|---|---|---|---|---|---|
| | CHARGING RATE [C] | FILM THICKNESS RATIO [$1^{st}$ LAYER (Graphite):$2^{nd}$ LAYER (Graphite)] | CAPACITY RETENTION RATIO AFTER 200 CYCLES [%] | LITHIUM DEPOSITION | INITIAL CAPACITY [mAh] |
| Comparative Example 1-1 | 1.0 | 100:0 | 90 | no | 810 |
| Comparative Example 4-1 | 1.0 | 95:5 | 90 | no | 810 |
| Comparative Example 4-2 | 1.0 | 90:10 | 90 | no | 810 |
| Comparative Example 4-3 | 1.0 | 65:35 | 90 | no | 810 |
| Comparative Example 4-4 | 1.0 | 50:50 | 90 | no | 810 |
| Comparative Example 4-5 | 1.0 | 25:75 | 90 | no | 810 |
| Comparative Example 1-1 | 1.0 | 0:100 | 90 | no | 810 |
| Comparative Example 1-1 | 1.5 | 100:0 | 78 | yes | 810 |
| Comparative Example 4-1 | 1.5 | 95:5 | 78 | yes | 810 |
| Comparative Example 4-2 | 1.5 | 90:10 | 78 | yes | 810 |
| Comparative Example 4-3 | 1.5 | 65:35 | 78 | yes | 810 |
| Comparative Example 4-4 | 1.5 | 50:50 | 78 | yes | 810 |

TABLE 4-continued

Charging voltage: 4.20 V

| | CHARGING RATE [C] | FILM THICKNESS RATIO [$1^{st}$ LAYER (Graphite):$2^{nd}$ LAYER (Graphite)] | CAPACITY RETENTION RATIO AFTER 200 CYCLES [%] | LITHIUM DEPOSITION | INITIAL CAPACITY [mAh] |
|---|---|---|---|---|---|
| Comparative Example 4-5 | 1.5 | 25:75 | 78 | yes | 810 |
| Comparative Example 1-1 | 1.5 | 0:100 | 78 | no | 810 |
| Comparative Example 1-1 | 2.0 | 100:0 | 67 | yes | 810 |
| Comparative Example 4-1 | 2.0 | 95:5 | 67 | yes | 810 |
| Comparative Example 4-2 | 2.0 | 90:10 | 67 | yes | 810 |
| Comparative Example 4-3 | 2.0 | 65:35 | 67 | yes | 810 |
| Comparative Example 4-4 | 2.0 | 50:50 | 67 | yes | 810 |
| Comparative Example 4-5 | 2.0 | 25:75 | 67 | yes | 810 |
| Comparative Example 1-1 | 2.0 | 0:100 | 67 | no | 810 |

It was known from Table 4, that Comparative Example 4-1 to Comparative Example 4-5 showed high initial capacity, but showed lithium deposition on the surface of the negative electrode under high-load charging at a charging rate raised as high as 1.5 C and 2.0 C, resulted in lowered capacity retention ratio.

Next, batteries adopting the negative electrodes having a graphite layer as the first layer and a non-graphitizable carbon layer as the second layer were manufactured, and evaluated under high-load charging while varying the charge voltage.

The non-aqueous electrolyte secondary batteries were manufactured in a manner similar to that described in Example 1-1, using thus-manufactured negative electrodes of Example 1-1 to Example 1-5, Comparative Example 1-1 and Comparative Example 1-2. The non-aqueous electrolyte secondary batteries were designed, when charged using a standard charger, so as to adjust the full charge voltage under actual operation to 4.25 V, 4.35 V, 4.50 V and 4.55 V, based on adjustment of the amount of positive electrode active material and the amount of negative active material (high voltage model). This is because elevation in the charge voltage increases the amount of lithium ion extracted from the positive electrode during charging, and this consequently requires larger amounts of negative active material capable of accepting the lithium ion.

Thus-manufactured high voltage type non-aqueous electrolyte secondary batteries of Example 1-1 to Example 1-5, Comparative Example 1-1 and Comparative Example 1-2 were evaluated with respect to (A) initial capacity, (B) capacity retention ratio at 2.0 C, and (C) lithium deposition similarly to Example 1-1, except that the charge voltage was varied among 4.25 V, 4.35 V, 4.5 V and 4.55 V. For the high voltage type non-aqueous electrolyte secondary batteries, the capacity retention ratio after the 200th cycle was determined only for the case where the current value was fixed to 2.0 C.

Results of evaluation of ratio of thickness of the first layer and the second layer, capacity retention ratio after the 200th cycle, lithium deposition, and initial capacity of the non-aqueous electrolyte secondary batteries of Example 1-1 to Example 1-5, Comparative Example 1-1 and Comparative Example 1-2, measured while varying the charge voltage, are shown in Table 5.

TABLE 5

Charging Rate: 2.0 C

| | CHARGING VOLTAGE [V] | FILM THICKNESS RATIO [$1^{st}$ LAYER (Graphite):$2^{nd}$ LAYER (Hard Carbon)] | CAPACITY RETENTION RATIO AFTER 200 CYCLES [%] | LITHIUM DEPOSITION | INITIAL CAPACITY [mAh] |
|---|---|---|---|---|---|
| Comparative Example 1-1 | 4.25 | 100:0 | 65 | yes | 821 |
| Example 1-1 | 4.25 | 95:5 | 70 | no | 803 |
| Example 1-2 | 4.25 | 90:10 | 71 | no | 795 |
| Example 1-3 | 4.25 | 65:35 | 72 | no | 782 |
| Example 1-4 | 4.25 | 50:50 | 72 | no | 766 |
| Example 1-5 | 4.25 | 25:75 | 73 | no | 750 |
| Comparative Example 1-2 | 4.25 | 0:100 | 73 | no | 731 |
| Comparative Example 1-1 | 4.35 | 100:0 | 64 | yes | 836 |
| Example 1-1 | 4.35 | 95:5 | 70 | no | 817 |
| Example 1-2 | 4.35 | 90:10 | 70 | no | 809 |

TABLE 5-continued

Charging Rate: 2.0 C

|  | CHARGING VOLTAGE [V] | FILM THICKNESS RATIO [1st LAYER (Graphite):2nd LAYER (Hard Carbon)] | CAPACITY RETENTION RATIO AFTER 200 CYCLES [%] | LITHIUM DEPOSITION | INITIAL CAPACITY [mAh] |
|---|---|---|---|---|---|
| Example 1-3 | 4.35 | 65:35 | 71 | no | 797 |
| Example 1-4 | 4.35 | 50:50 | 71 | no | 780 |
| Example 1-5 | 4.35 | 25:75 | 72 | no | 764 |
| Comparative Example 1-2 | 4.35 | 0:100 | 72 | no | 744 |
| Comparative Example 1-1 | 4.50 | 100:0 | 62 | yes | 851 |
| Example 1-1 | 4.50 | 95:5 | 70 | no | 832 |
| Example 1-2 | 4.50 | 90:10 | 70 | no | 824 |
| Example 1-3 | 4.50 | 65:35 | 70 | no | 811 |
| Example 1-4 | 4.50 | 50:50 | 71 | no | 794 |
| Example 1-5 | 4.50 | 25:75 | 71 | no | 777 |
| Comparative Example 1-2 | 4.50 | 0:100 | 71 | no | 757 |
| Comparative Example 1-1 | 4.55 | 100:0 | 60 | yes | 855 |
| Example 1-1 | 4.55 | 95:5 | 62 | yes | 836 |
| Example 1-2 | 4.55 | 90:10 | 63 | yes | 828 |
| Example 1-3 | 4.55 | 65:35 | 66 | yes | 815 |
| Example 1-4 | 4.55 | 50:50 | 66 | yes | 798 |
| Example 1-5 | 4.55 | 25:75 | 66 | yes | 781 |
| Comparative Example 1-2 | 4.55 | 0:100 | 67 | yes | 761 |

It was known from Table 5 that the initial capacity increased as the charge voltage increased to 4.25 V or above. This is because elevation of the charge voltage increased the amount of lithium ion extracted from the positive electrode. It was also found that Example 1-1 to Example 1-5 showed no lithium deposition under a charge voltage of 4.25 V to 4.50 V, and that degradation in the capacity retention ratio was suppressed. In other words, it was found that degradation in the capacity retention ratio under high-load charging can be suppressed, when the negative active material layer composed of the double-layered structure, having a graphite layer as the first layer and a hard carbon layer as the second layer, was adopted. Based on the observation that the initial capacity decreased as the thickness of the second layer increased even in the batteries of high voltage type, it was also found that the ratio of thickness of the graphite layer as the first layer and the hard carbon layer as the second layer is preferably adjusted, for example, to 95:5 to 50:50, in view of suppressing excessive lowering in the capacity and of suppressing lowering in the capacity retention ratio. From the results shown in Table 1 to Table 5, it was still also found that the voltage is preferably falls within a range from 4.20 V to 4.50 V, in view of improving the cycle performance under high-load charging.

Next, non-aqueous electrolyte secondary batteries having a thin coating of a negative active material layer, which is believed to be effective for high-load charging, and the non-aqueous electrolyte secondary batteries adopting negative active materials having small grain sizes were examined.

Comparative Example 5-1

A negative electrode of Comparative Example 5-1 was manufactured similarly to that described in Comparative Example 1-1, except that the negative active material layer was formed by coating on the negative electrode current collector, to a thickness of 75 μm (i.e., 75% of the thickness of the negative active material layer in Comparative Example 1-1).

Comparative Example 5-2

A negative electrode of Comparative Example 5-2 was manufactured similarly to that described in Comparative Example 1-1, except that the negative active material layer was formed by coating on the negative electrode current collector, to a thickness of 50 μm (i.e., 50% of the thickness of the negative active material layer in Comparative Example 1-1).

Comparative Example 5-3

A negative electrode of Comparative Example 5-3 was manufactured similarly to that described in Comparative Example 1-1, except that the an artificial graphite having a mean grain size of 20 μm (i.e., 65% of the grain size of the artificial graphite powder used in Comparative Example 1-1) was used. The thickness of the negative active material layer was 100 μm.

Comparative Example 5-4

A negative electrode of Comparative Example 5-4 was manufactured similarly to as described in Comparative Example 1-1, except that the an artificial graphite having a mean grain size of 9 μm (i.e., 30% of the grain size of the artificial graphite powder used in Comparative Example 1-1) was used. The thickness of the negative active material layer was 100 μm.

The non-aqueous electrolyte secondary batteries shown in FIG. 1 and FIG. 2 were manufactured in a manner similar to that in Example 1-1, using thus-manufactured negative electrodes of Comparative Example 5-1 to Comparative Example 5-4. The non-aqueous electrolyte secondary batteries of Comparative Example 5-1 and Comparative Example 5-4 manufactured as described in the above were evaluated with respect to (A) initial capacity, (B) capacity retention ratio after the 200th cycle, and (C) lithium deposition, similarly to Example 1-1.

Results of evaluation of capacity retention ratio after the 200th cycle, lithium deposition, and initial capacity of the non-aqueous electrolyte secondary batteries of Comparative Example 5-1 to Comparative Example 5-4 are shown in Table 6.

TABLE 6

| | Charging Voltage: 4.20 V | | | |
|---|---|---|---|---|
| | CHARGING RATE [C] | CAPACITY RETENTION RATIO AFTER 200 CYCLES [%] | LITHIUM DEPO- SITION | INITIAL CAPACITY [mAh] |
| Comparative Example 5-1 | 1.0 | 93 | no | 650 |
| Comparative Example 5-2 | 1.0 | 96 | no | 605 |
| Comparative Example 5-3 | 1.0 | 92 | no | 630 |
| Comparative Example 5-4 | 1.0 | 95 | no | 600 |
| Comparative Example 5-1 | 1.5 | 83 | no | 650 |
| Comparative Example 5-2 | 1.5 | 86 | no | 605 |
| comparative example 5-3 | 1.5 | 82 | no | 630 |
| comparative example 5-4 | 1.5 | 85 | no | 600 |
| comparative example 5-1 | 2.0 | 73 | no | 650 |
| comparative example 5-2 | 2.0 | 76 | no | 605 |
| comparative example 5-3 | 2.0 | 72 | no | 630 |
| comparative example 5-4 | 2.0 | 75 | no | 600 |

It was known from Table 6 that Comparative Example 5-1 to Comparative Example 5-4 showed no lithium deposition even under the high-load charging at a charging rate raised as high as 1.5 C and 2.0 C, and were thereby suppressed in degradation of the capacity retention ratio, but were lowered in the initial capacity. This is supposedly because Comparative Example 5-1 and Comparative Example 5-2, having the negative active material layers coated only to small thickness, were relatively increased in the ratio of volume occupied by the negative electrode current collector, thereby degrading the volume efficiency. Alternatively, this is supposedly because Comparative Example 5-3 and Comparative Example 5-4, using the negative active material having small grain sizes, were lowered in the packing performance of the active material, and were thereby degraded in the initial charge/discharge efficiency.

From these results, it was found that a sufficient level of initial capacity can be obtained, the lithium deposition on the surface of the negative electrode can be suppressed even under high-load charging, and thereby secondary batteries having excellent cycle performances can be obtained, by composing the negative active material layer as having the double-layered structure, using the graphite layer as the first layer and using a hard carbon layer as the second layer. Because the initial capacity decreases as the ratio of thickness of the hard carbon layer used as the second layer increases, it was also found that the ratio of thickness of the graphite layer as the first layer and the hard carbon layer as the second layer is preferably adjusted to 95:5 to 50:50, for example.

It was also found that the lithium deposition on the surface of the negative electrode can be suppressed even under high-load charging, and consequently the non-aqueous electrolyte secondary batteries having excellent cycle performances can be obtained, by using thus-configured negative electrode. In view of obtaining this sort of effect, it was found preferable to adjust the charge voltage to 4.20 V to 4.50 V. In addition, according to the present invention, also capacity and energy density of the batteries can be improved, because degradation in the cycle performance under high-load charging can be suppressed without adopting thin coating of the negative active material layer, or without using the negative active materials having smaller grain sizes.

The foregoing paragraphs have specifically described the first and second embodiments of the present invention, without limiting the present invention to any one of the above-described embodiment, allowing various modifications based on the technical spirit of the present invention. For example, numerical values, materials and procedures described in any of the embodiments are merely of exemplary purposes, allowing adoption of any different numerical values, materials and procedures.

Geometries of the non-aqueous electrolyte secondary batteries are not limited to those described in the first and second embodiments, allowing adoption of any other geometries of square box, sheet, coin, button and so forth.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A non-aqueous electrolyte secondary battery comprising:
    a positive electrode;
    a negative electrode;
    a separator; and
    an electrolyte, wherein the negative electrode includes:
        a current collector having a pair of opposed surfaces,
        a first layer provided on the current collector, and
        a second layer provided on the first layer,
    wherein the first layer contains a negative active material composed of a graphite material, and
    wherein the second layer contains a negative active material composed of a non-graphitizable carbonaceous material; and
    wherein the negative active material of the first layer consists of graphite and the negative active material of the second layer consists of the non-graphitizable carbonaceous material.

2. The non-aqueous electrolyte secondary battery as claimed in claim 1, wherein the electrolyte contains at least ethylene carbonate.

3. The non-aqueous electrolyte secondary battery as claimed in claim 2, wherein the electrolyte further contains at least one species selected from the group consisting of propylene carbonate, dimethyl carbonate, ethyl methyl carbonate, and diethyl carbonate.

4. The non-aqueous electrolyte secondary battery as claimed in claim 1, wherein the electrolyte contains at least one species selected from the group consisting of polyvinylidene fluoride, copolymer of polyvinylidene fluoride and hexafluoropropylene, copolymer of polyvinylidene fluoride and hexafluoropropylene and monochlorotrifluoroethylene, and copolymer of polyvinylidene fluoride and hexafluoropropylene and monomethyl maleate.

5. The non-aqueous electrolyte secondary battery as claimed in claim 1, wherein the graphite has an interplanar spacing of the (002) surfaces of 3.37 Å or smaller, and an Lc value of 150 Å or larger.

6. The non-aqueous electrolyte secondary battery as claimed in claim 1, wherein the graphite is artificial graphite.

7. The non-aqueous electrolyte secondary battery as claimed in claim 1, wherein the non-graphitizable carbonaceous material has an interplanar spacing of the (002) surfaces of 3.44 Å or larger, and an Lc value of 80 Å or smaller.

8. The non-aqueous electrolyte secondary battery as claimed in claim 1, wherein a ratio of thickness of a graphite layer composing the first layer and a hard carbon layer composing the second layer falls in a range from 95:5 to 50:50.

9. The non-aqueous electrolyte secondary battery as claimed in claim 1, wherein a charge voltage thereof falls in a range from 4.25 V to 4.50 V.

10. The non-aqueous electrolyte secondary battery as claimed in claim 1, wherein the non-graphitizable carbonaceous material includes crystallite.

* * * * *

UNITED STATES PATENT AND TRADEMARK OFFICE
CERTIFICATE OF CORRECTION

PATENT NO. : 8,329,340 B2
APPLICATION NO. : 11/844634
DATED : December 11, 2012
INVENTOR(S) : Mori et al.

Page 1 of 1

It is certified that error appears in the above-identified patent and that said Letters Patent is hereby corrected as shown below:

ON THE TITLE PAGE, ITEM (75)

In the "Inventors" replace
"Mahio Shibuya, Fukushima (JP)" with
-- Mashio Shibuya, Fukushima (JP) --.

Signed and Sealed this
Eleventh Day of June, 2013

Teresa Stanek Rea
*Acting Director of the United States Patent and Trademark Office*